INVENTORS:
J. J. SCHWARTZ
H. W. D. CASSIDY

BY: *Edwin D. Grant*
ATTORNEY

United States Patent Office 3,349,564
Patented Oct. 31, 1967

3,349,564
SOLID PROPELLANT ROCKET MOTOR
Jules J. Schwartz, Wilmington, Del., and Herbert W. D. Cassidy, Elkton, Md., assignors to Thiokol Chemical Corp., Bristol, Pa., a corporation of Delaware
Filed Sept. 29, 1965, Ser. No. 491,085
2 Claims. (Cl. 60—253)

This invention relates to a solid propellant rocket motor and more particularly to an improved solid propellant rocket motor of the type having a charge that burns at both ends thereof when the motor is fired.

In some instances, it is advantageous to ignite and simultaneously burn both ends of the combustible charge, or grain, of a solid propellant rocket motor so as to substantially increase the amount of gas generated in a given time when the motor is fired. Heretofore, in rocket motors of the conventional type having a charge which extends longitudinally of an elongated motor casing and a nozzle located at the aft end of said casing, a duct has been centrally positioned in the charge and made co-extensive therewith so as to provide a passage through which gas evolved from combustion of the forward end surface of the charge can pass rearwardly to the rocket nozzle. Such a ducting arrangement has several disadvantages, one of which is the necessity of providing supports for maintaining the centrally-located duct in fixed position as the charge is consumed, the payload which can be carried by the rocket being adversely affected by the weight of these supports and the space within the motor casing taken thereby. Furthermore, in order to prevent ignition of the surface of the charge adjacent the aforementioned duct (as a result of heat transfer from the high-temperature gas in the duct through the wall of said duct to the charge) it is necessary to provide insulation on the duct or to form it of a relatively thick insulating material. The increased weight of the duct required for the purpose of insulation obviously will also adversely affect the payload of the rocket motor.

It is therefore, a primary object of this invention to provide an improved solid propellant rocket motor of the type having a charge that burns at both ends thereof when the motor is fired.

Another object of this invention is to minimize the weight of a solid propellant rocket motor of the type having a charge that burns at both ends thereof when the motor is fired.

A further object of this invention is to minimize the possibility of ignition of a peripheral surface of the combustible charge of a double end-burning, solid propellant rocket motor.

Figure 1:
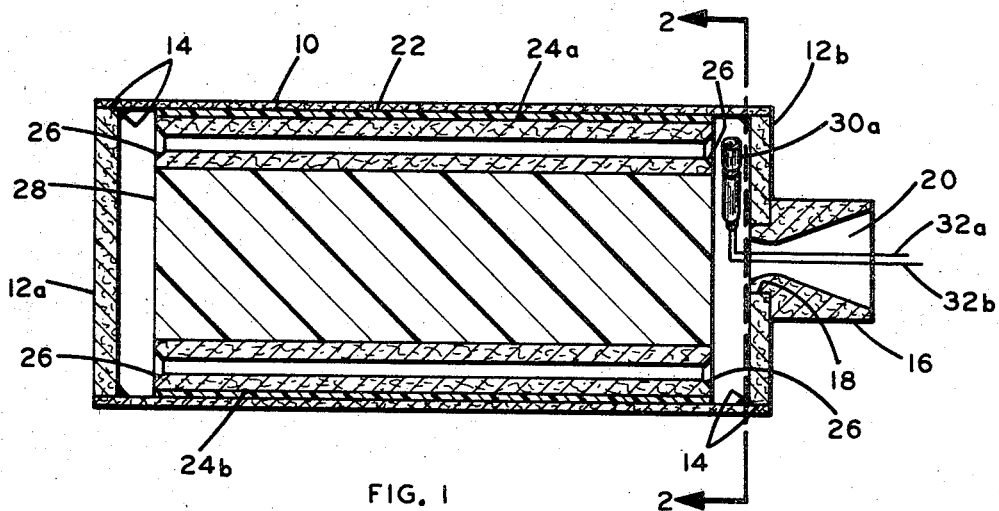
Figure 2:
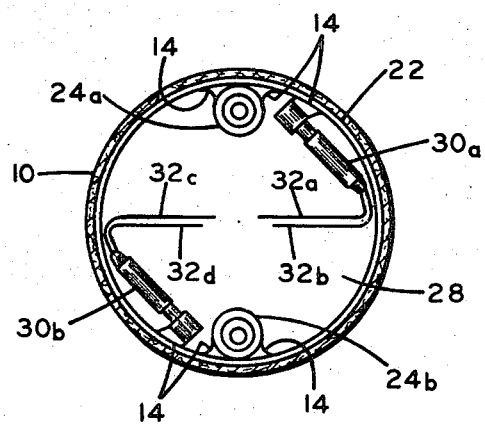

These and other objects of this invention are achieved by means of a preferred embodiment of the invention which is described in detail in the following specification and illustrated in the accompanying drawings, wherein:

FIGURE 1 is a sectional view of the preferred embodiment of the invention taken along a plane that passes through the longitudinal axis of the casing of said embodiment; and FIGURE 2 is a full cross-sectional view of the preferred embodiment of the invention taken along a plane represented by line 2—2 of FIGURE 1 and in the direction indicated therein.

Throughout the specification and drawings, like reference numbers refer to like parts.

The preferred embodiment of the invention illustrated in FIGS. 1 and 2 comprises a cylindrical casing 10 having an end closure 12a, 12b fixedly secured to each end thereof by means of adhesive 14. A thrust nozzle 16 is fixedly secured within an aperture 18 which extends through end closure 12a and is centered with respect to the longitudinal axis of casing 10, this thrust nozzle having a venturi-type orifice 20. The inner surface of casing 10 is coated with a suitable liner material 22 the thickness of which is exaggerated in the drawings for clarity. Two gas ducts 24a, 24b are bonded by means of adhesive 14 to the inner surface of casing 10 at diametrically opposed points thereon. Each gas duct 24a, 24b extends longitudinally of casing 10, and the ends thereof are respectively spaced from end closure 12a, 12b. For a reason that will be explained hereinafter, the forward and rear edges of the apertures in gas ducts 24a, 24b are provided with chamfers 26. The aforementioned liner material 22 is applied in liquid form to the portions of the peripheral surfaces of gas ducts 24a, 24b exposed to the interior of casing 10 (i.e., the portions of the peripheral surfaces of the gas ducts that are not in contact with the adhesive 14 used to bond the gas ducts to casing 10), and to the inner surface of casing 10 between end closures 12a, 12b. Liner material 22 is then cured to the solid state by conventional techniques well-known to persons skilled in the art of rocket motors. Thereafter a solid propellant charge 28 is cast within that portion of casing 10 between the ends of gas ducts 24a, 24b, the peripheral surface of said charge being bonded to the inner surface of said casing by liner material 22. More particularly, the end surfaces of charge 28 are respectively flush with the ends of gas ducts 24a, 24b and are thus respectively spaced from end closures 12a, 12b. Since the longitudinally extending surfaces of casing 10, gas ducts 24a, 24b, and charge 28 are bonded together by liner material 22, gas generated by combustion of the forward end surface of the charge can reach thrust nozzle 16 only by passing through the gas ducts.

Positioned within casing 10 between end closure 12b and charge 28 are two igniters 30a, 30b which are respectively fixedly secured to the inner surface of liner material 22 by means of adhesive 14. Igniters 30a, 30b are provided with insulated wires 32a through 32d that extend through the orifice of thrust nozzle 16 and are connected to conventional means (not shown) adapted to pass electric current through said wires when charge 28 is to be ignited.

In the preferred embodiment of the invention, casing 10, end closures 12a, 12b and thrust nozzle 16 are formed of a heat-resistant fibrous material. A suitable adhesive is used to bond these and other components of the rocket motor together. Charge 28 may be any one of the various solid propellants used in rocket motors, and igniters 30a, 30b comprise well-known conventional materials that deflagrate when electric current passes through wires 32a through 32d. Gas ducts 24a, 24b are formed of an ablative, heat-resistant, fibrous material that progressively deteriorates when the high-temperature products of combustion of charge 28 pass through said gas ducts and which is removed with this gas in the form of flakes. For example, gas ducts 24a, 24b can be formed of multiple layers of paper or silica cloth impregnated with phenolic resin.

When igniters 30a, 30b are ignited, the flame therefrom ignites the aft end surface of charge 28. The high-temperature gases evolved from combustion of igniters 30a, 30b and the aft end surface of charge 28 flow not only through the orifice of thrust nozzle 16 but also flow forwardly through gas ducts 24a, 24b to the open space at the forward end of said charge. Consequently, the forward end surface of charge 28 is also ignited. If desired, a removable plug (not shown) can be placed in the throat of thrust nozzle 16 so that the aforementioned combustion products can initially escape from the space between end closure 12b and charge 28 only by passing through gas ducts 24a, 24b to the forward end of casing 10, thus increasing the rate of heating of the forward end surface of charge 28 and expediting the ignition thereof. This plug would, of course, be secured to thrust nozzle 16 in such a way that it would be blown out of the thrust nozzle when gas pressure in casing 10 reaches a predetermined level. After the forward end surface of charge 28 has been ignited, high-temperature gas flows through gas ducts 24a, 24b and passes out of casing 10 through nozzle 16 along with gas evolved from combustion of the aft end surface of said charge. The chamfers 26 in the ends of gas ducts 24a, 24b are provided to reduce the possibility of the ablative material at these points being torn away in large pieces that may block the apertures in the gas ducts.

The described and illustrated preferred embodiment of the present invention provides important advantages over the centrally-located gas duct previously utilized in double end-burning solid propellant rocket motors. Since gas ducts 24a, 24b are bonded to the wall of the rocket motor casing, the weight of the aforementioned supports required for maintaining a centrally-located duct in fixed position is eliminated, and the useful payload of the preferred embodiment of this invention is to this extent larger than that of double end-burning rocket motors having central duct structures. In rockets of large size, this weight differential can be of considerable significance. The preferred embodiment of this invention obviously can also be more economically manufactured than known double end-burning rocket motors which require supports for centrally-located gas ducts. An additional advantage of the preferred embodiment of this invention is provided by the fact that heat transferred to gas ducts 24a, 24b from the high-temperature combustion products passing therethrough can flow to casing 10 and thence to the surrounding environment, whereas heat transferred to a centrally-located gas duct passes to the abutting charge and increases the possibility of ignition thereof. Furthermore, as gas ducts 24a, 24b are made of an ablative material which is progressively removed along with the gas passing through the gas ducts, heat is also carried away from the gas ducts by this means. It is to be clearly understood that the invention is not limited to the number of gas ducts employed in the preferred embodiment herein described, since in some rocket motors a single gas duct may provide suitable gas flow characteristics therein, whereas in other rocket motors, more than two gas ducts may be required.

Many modifications of the described and illustrated double end-burning rocket motor can be made without departing from the principles of the invention. For example, igniters could be placed at both ends of charge 28. Such modifications are obviously within the scope of the invention, which is to be limited only by the terms of the appended claims.

What is claimed is:
1. A rocket motor comprising:
   a tubular casing having an end closure fixedly secured to each end thereof;
   a thrust nozzle fixedly secured to one of said end closures;
   at least one gas duct fixedly secured to the inner surface of said casing and extending longitudinally thereof, the ends of said gas duct being respectively spaced from said end closures;
   a combustible charge disposed between the ends of said gas duct, the peripheral surface of said charge being bonded to the inner surface of said casing and to the peripheral surface of said gas duct exposed to the interior of said casing; and
   means for igniting at least one end surface of said charge.
2. A rocket motor as defined in claim 1 wherein said gas duct is formed of an ablative material.

No references cited.

CARLTON R. CROYLE, *Primary Examiner.*